United States Patent
Chen et al.

(10) Patent No.: US 10,275,387 B2
(45) Date of Patent: Apr. 30, 2019

(54) METHOD AND ASSOCIATED INTERFACE CIRCUIT FOR MITIGATING INTERFERENCE DUE TO SIGNALING OF A BUS

(71) Applicant: MEDIATEK Inc., Hsin-Chu (TW)

(72) Inventors: Ming-Pei Chen, Taichung (TW);
Chuing-Nien Tseng, Taoyuan (TW);
Juei-Ting Sun, Kaohsiung (TW);
Kuo-Chieh Wang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 203 days.

(21) Appl. No.: 15/185,060

(22) Filed: Jun. 17, 2016

(65) Prior Publication Data
US 2017/0046302 A1 Feb. 16, 2017

Related U.S. Application Data

(60) Provisional application No. 62/203,012, filed on Aug. 10, 2015.

(51) Int. Cl.
*G06F 13/42* (2006.01)
*G06F 13/40* (2006.01)

(52) U.S. Cl.
CPC ........ *G06F 13/4282* (2013.01); *G06F 13/409* (2013.01); *G06F 13/4022* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 9,824,057 B2 | 11/2017 | Luo | |
| 2013/0013842 A1* | 1/2013 | Numamoto | G06F 13/00 710/316 |

FOREIGN PATENT DOCUMENTS

CN 105379132 A 3/2016

OTHER PUBLICATIONS

"USB 3.0* Radio Frequency Interference Impact on 2.4 GHz Wireless Devices"; Intel; Apr. 2012; pp. 1-22.
(Continued)

*Primary Examiner* — Idriss N Alrobaye
*Assistant Examiner* — Dayton Lewis-Taylor
(74) *Attorney, Agent, or Firm* — McClure, Qualey & Rodack, LLP

(57) ABSTRACT

The present invention provides method and associated interface circuit for mitigating interference due to signaling of a bus between two electronic apparatuses. The method may include: via the bus mechanically compliant to a bus specification, communicating and transporting data at a nonstandard speed which is not compliant to the bus specification. The method may further include: before communicating and transporting data at the nonstandard speed, signaling via the bus at a standard speed to configure a speed switching from the standard speed to the nonstandard speed, with the standard speed compliant to the bus specification. For example, the bus specification may be USB specification, the standard speed may be 5 Gbps (SuperSpeed of USB 3.0 specification), and the nonstandard speed may be lower than the standard speed, e.g., 2.5 Gbps, which forms a spectrum notch at a frequency of wireless connection, e.g., 2.4 GHz of Wi-Fi.

16 Claims, 4 Drawing Sheets

(56) References Cited

OTHER PUBLICATIONS

CN Office Action dated Oct. 26, 2018 in Chinese application (No. 201610640619.8).

* cited by examiner

… (US 10,275,387 B2)

METHOD AND ASSOCIATED INTERFACE CIRCUIT FOR MITIGATING INTERFERENCE DUE TO SIGNALING OF A BUS

This application claims the benefit of U.S. provisional application Ser. No. 62/203,012, filed Aug. 10, 2015, the subject matter of which is incorporated herein by reference.

FIELD OF THE INVENTION

The present invention relates to a method and associated interface circuit for mitigating interference due to signaling of a bus, and more particularly, to a method and associated interface circuit configurable to link at a nonstandard speed different from a compliant standard speed which leaks more power to interfere wireless connection.

BACKGROUND OF THE INVENTION

A standardized bus, such as a bus compliant to USB (Universal Serial Bus) specification developed by USB IF (USB Implementers Forum), is useful for interconnecting two electronic apparatuses, e.g., a host and a device. Via the bus, the device can cooperate with the host to expand functionalities of the host. Please refer to FIG. 1 illustrating two electronic apparatuses 10a and 10b respectively as a host and a device connected by a bus 11 which is compliant to a bus specification, e.g., the USB specification. The bus 11 mechanically connects via two mated physical connectors 11a and 11b respectively disposed on the electronic apparatuses 10a and 10b, and allows signaling (transmitting and/or receiving) between the electronic apparatuses 10a and 10b at standard speed(s) compliant to the bus specification.

For example, the apparatus 10a may be a desktop computer, a notebook computer, a tablet computer, a set-top box, a media player, a game console, etc., while the apparatus 10b may be a wireless (e.g., Wi-Fi or Bluetooth) adapter or dongle which establishes wireless connection enabling the apparatus 10a to transmit and/or receive signals to and/or from a wireless network (not shown) or a wireless accessory (e.g., keyboard, mouse, earphone, headset or glasses for experiencing virtual or augmented reality, not shown).

Modern bus specification tends to aggressively raise its standard speed to meet demands of high-rate data interchange. For example, besides a standard speed of 480 Mbps (megabits per second) named as HighSpeed, the USB 3.0 specification introduces another standard speed of 5 Gbps (gigabits per second) named as SuperSpeed. However, bus signaling at such standard speed seriously interferes and degrades wireless connection. A USB-compliant bus signaling at SuperSpeed of 5 Gbps may form a power spectrum density as modeled in FIG. 2, which leaks considerable power at frequency of wireless connection, e.g., 2.4 GHz. The power leakage at 2.4 GHz then causes undesired interference to wireless connection. For example, if the wireless connection is for wireless networking (e.g., Wi-Fi networking), desired signals of the wireless networking will be de-sensed by the undesired interference and therefore suffers from low signal-to-noise ratio and high bit error rate; if the wireless connection is for wireless accessory like a mouse, mouse pointer or cursor at the host may even fail to respond movement of mouse.

SUMMARY OF THE INVENTION

An objective of the invention is providing a method (e.g., 500 in FIG. 5) for mitigating interference due to signaling of a bus (e.g., 70 in FIG. 4a) between two electronic apparatuses (e.g., 20a and 20b in FIG. 4a). The method may include: via the bus mechanically compliant to a bus specification (e.g., the USB specification), communicating and transporting data at a nonstandard speed, wherein the nonstandard speed is not compliant to the bus specification. That is, the method may enable the two electronic apparatuses to be directly linked at the nonstandard bus speed after the two electronic apparatuses are both powered on. For deploying the method to old marketing electronic apparatus via software update, the method may further include: before communicating and transporting data at the nonstandard speed (e.g., 538 in FIG. 5), signaling via the bus at a standard speed to configure a speed switching (e.g., 520 in FIG. 5) from the standard speed to the nonstandard speed, wherein the standard speed (e.g., SuperSpeed) is compliant to the bus specification, and substantially different from the nonstandard speed.

The step of signaling via the bus at the standard speed to configure the speed switching may include: via the bus, downloading a nonstandard-speed-change capable firmware from a first one (e.g., 20a) of the two electronic apparatuses to a second one (e.g., 20b) of the two electronic apparatuses at the standard speed (e.g., 524 in FIG. 5), and commanding the second one of the two electronic apparatuses (e.g., 526) to stop signaling at the standard speed via the bus (e.g., 532), and to start communicating and transporting data at the nonstandard speed via the bus (e.g., 536, 538) by executing the nonstandard-speed-change capable firmware.

The method may further include: before signaling via the bus at the standard speed to configure the speed switching, performing a first receiver detection, a first polling and a first training to prepare and initialize signaling at the standard speed (e.g., 512 in FIG. 5), and establishing a first logic link between the two electronic apparatuses for signaling via the bus at the standard speed (e.g., 514). The method may further include: via the first logic link, performing an enumeration for a device driver to be probed and active according to a result of the enumeration (e.g., 522); and, after configuring the speed switching, disconnecting the first logic link (e.g., 532) before communicating and transporting data via the bus at the nonstandard speed. The method may further include: after disconnecting the first logic link, before communicating and transporting data via the bus at the nonstandard speed, performing a second receiver detection, a second polling and a second training to prepare and initialize signaling at the nonstandard speed (e.g., 536 in FIG. 5), and establishing a second logic link between the two electronic apparatuses for communicating and transporting data via the bus at the nonstandard speed (e.g., 538).

According to an embodiment of the invention, while at least one of the two electronic apparatuses further signals via a wireless connection other than the bus, signaling (e.g., communicating and transporting data) via the bus at the nonstandard speed is configured to form a spectrum notch at a frequency of the wireless connection (e.g., FIG. 3). According to an embodiment of the invention, signaling via the bus at the nonstandard speed is configured to leak less power at a frequency of the wireless connection (e.g., FIG. 3), comparing to power leaked at the frequency of the wireless connection by signaling via the bus at the standard speed (e.g., FIG. 2). According to an embodiment of the invention, the bus specification is the USB specification, the standard speed is SuperSpeed of 5 Gbps, and the nonstandard speed is lower than the standard speed. According to an embodiment of the invention, the nonstandard speed is between the standard speed and a second standard speed which is also compliant to the bus specification; for example, one of the standard speed and the second standard speed is SuperSpeed of 5 Gbps, and the other one of the standard speed and the second standard speed is HighSpeed of 480 Mbps.

An objective of the invention is providing an interface circuit (e.g., 40a or 40b in FIG. 4a) for a bus (e.g., 70) between two electronic apparatuses (e.g., 20a and 20b). The interface circuit may include a physical layer circuit (60a or 60b) coupled to the bus, and a controller (50a or 50b) coupled to the physical layer circuit. The physical layer circuit may signal via the bus at a standard speed to configure a speed switching from the standard speed to a nonstandard speed, and the controller may respond the speed switching by enabling the physical layer circuit to signal via the bus at the nonstandard speed.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
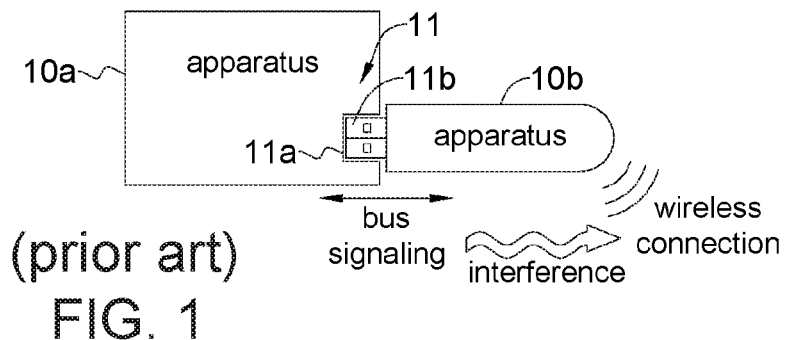
FIG. 1 (prior art) illustrates two electronic apparatuses connected by a bus.
Figure 2:
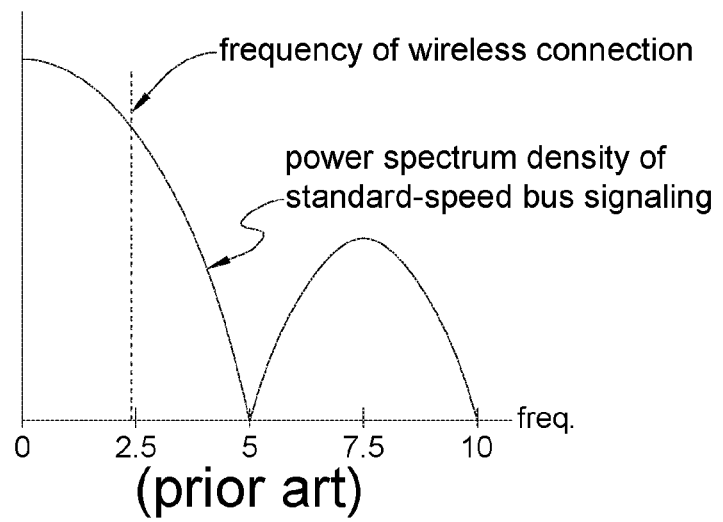
FIG. 2 prior a models power spectrum density of standard-speed bus signaling.
Figure 3:
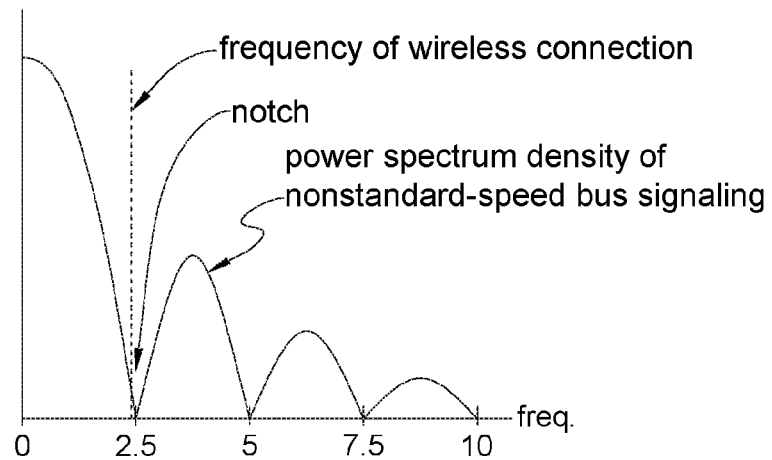
FIG. 3 models power spectrum density of nonstandard-speed bus signaling according to an embodiment of the invention.

As explained by FIG. 1 and FIG. 2, bus signaling at standard speed (e.g., SuperSpeed of 5 Gbps) causes interference to nearby wireless connection. To mitigate such interference, while signaling via a bus mechanically compliant to a bus specification, the invention adopts a nonstandard speed, wherein the nonstandard speed is not compliant to the bus specification. For example, the bus specification may be the USB 3.0 (or newer) specification; rather than the standard HighSpeed of 480 Mbps and SuperSpeed of 5 Gbps compliant to the USB specification, the invention may switch to a nonstandard speed, e.g., approximately 2.5 Gbps, which is substantially different from HighSpeed and SuperSpeed. Please refer to FIG. 3 modeling a power spectrum density caused by bus signaling at the nonstandard speed. Comparing to the considerable interference power leakage at the frequency (e.g., 2.4 GHz) of wireless connection caused by the standard-speed bus signaling (FIG. 2), the nonstandard-speed bus signaling may be configured to form a spectrum notch at the frequency of the wireless connection, and therefore to leak much less power at the frequency of the wireless connection.

Figure 4A:
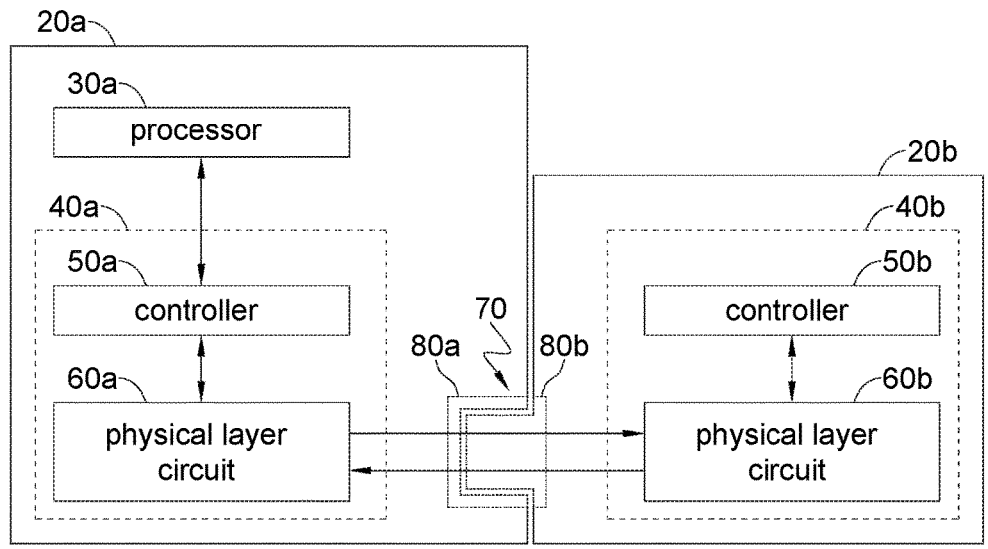
FIG. 4a illustrates two interface circuits according to an embodiment of the invention, for a bus between two electronic apparatuses.
Figure 4B:
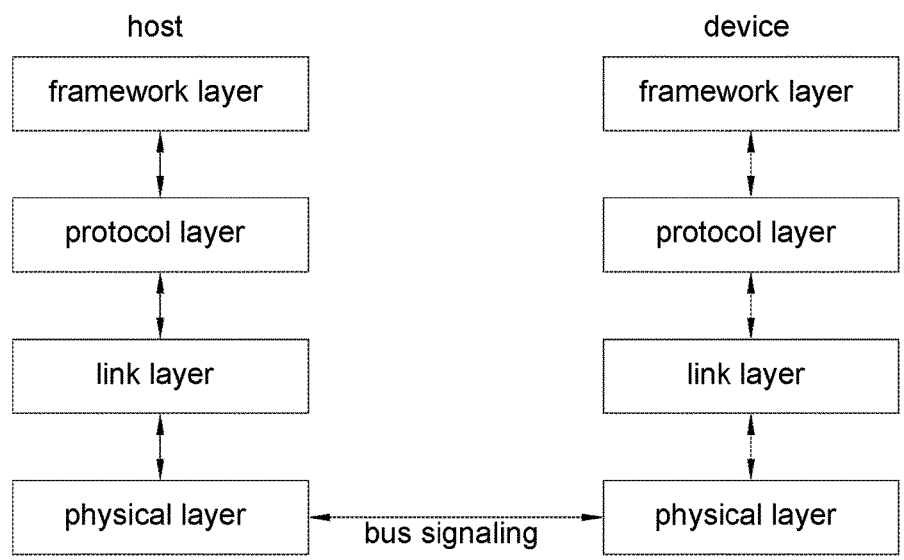
FIG. 4b illustrates a bus interconnection architecture implemented by the two electronic apparatuses shown in FIG. 4b.

Please refer to FIG. 4a and FIG. 4b. FIG. 4a illustrates two electronic apparatuses 20a and 20b according to an embodiment of the invention, wherein the electronic apparatuses 20a and 20b are connected via a bus 70 which is mechanically compliant to a bus specification, e.g., the USB specification. FIG. 4b illustrates interconnection architecture of the bus 70, wherein the electronic apparatuses 20a and 20b may respectively work as a host and a device to implement a framework layer, a protocol layer, a link layer and a physical layer. For example, the electronic apparatus 20a may be a desktop computer, a notebook computer, a tablet computer, a set-top box, a media player, a game console, etc.; the electronic apparatus 20b may be a mass storage device, a card reader, or a wireless (e.g., Wi-Fi or Bluetooth) adapter or dongle which forms wireless connection enabling the apparatus 10a to transmit and/or receive signals to and/or from a wireless network (not shown) or a wireless accessory (e.g., keyboard, mouse, speaker, earphone, headset or glasses for experiencing virtual or augmented reality, not shown). The electronic apparatus 20a may include a processor 30a for, e.g., executing software operation system to work as a kernel.

For signaling via the bus 70, the electronic apparatuses 20a and 20b respectively include interface circuits 40a and 40b. The interface circuit 40a may include a controller 50a and a physical layer circuit 60a to respectively implement the link layer (FIG. 4b) and the physical layer of the host. The controller 50a may be a logic hardware coupled to the physical layer circuit 60a, for controlling the physical layer circuit 60a. The physical layer circuit 60a is coupled to the bus 70 at a connector 80a disposed on the electronic apparatus 20a, and may include hardware for symbol encoding and decoding, serialization and deserialization, scrambling, equalizing, clock recovery, data recovery, transmitting and receiving.

Similarly, the controller 50b may be a logic hardware coupled to the physical layer circuit 60b, for controlling the physical layer circuit 60b. The physical layer circuit 60b is coupled to the bus 70 at a connector 80b disposed on the electronic apparatus 20b, and may include hardware for symbol encoding and decoding, serialization and deserialization, scrambling, equalizing, clock recovery, data recovery, transmitting and receiving. By wires in the mated connectors 80a and 80b mechanically compliant to the bus specification, each of the physical layer circuits 60a and 60b may include transmitter and receiver circuitry (not shown) respectively for transmitting signals to and receiving signals from the other one.

To mitigate interference caused by bus signaling at a standard speed compliant to the bus specification, each of the physical layer circuits 60a and 60b may be configured to transmit and receive signals at a nonstandard speed, wherein the nonstandard speed is substantially different from (e.g., lower than the standard speed, and the nonstandard speed is not compliant to the bus specification. Also, each of the controllers 50a and 50b may be configured to control signaling at the nonstandard speed. Hence, the two electronic apparatuses 20a and 20b may communicate and transport data at the nonstandard speed via the bus 70.

For backward compatibility of legacy electronic apparatus which only signals at the standard speed(s) initially after power on, each of the physical layer circuits 60a and 60b may be configured to selectively transmit and receive signals at the standard speed(s) and the nonstandard speed, and each of the controllers 50a and 50b may be configured to control signaling at the standard speed(s) and the nonstandard speed. Hence, the two electronic apparatuses 20a and 20b may signal via the bus 70 at the standard speed to configure a speed switch from the standard speed to the nonstandard speed, and then communicate and transport data via the bus 70 at the nonstandard speed.

Figure 5:
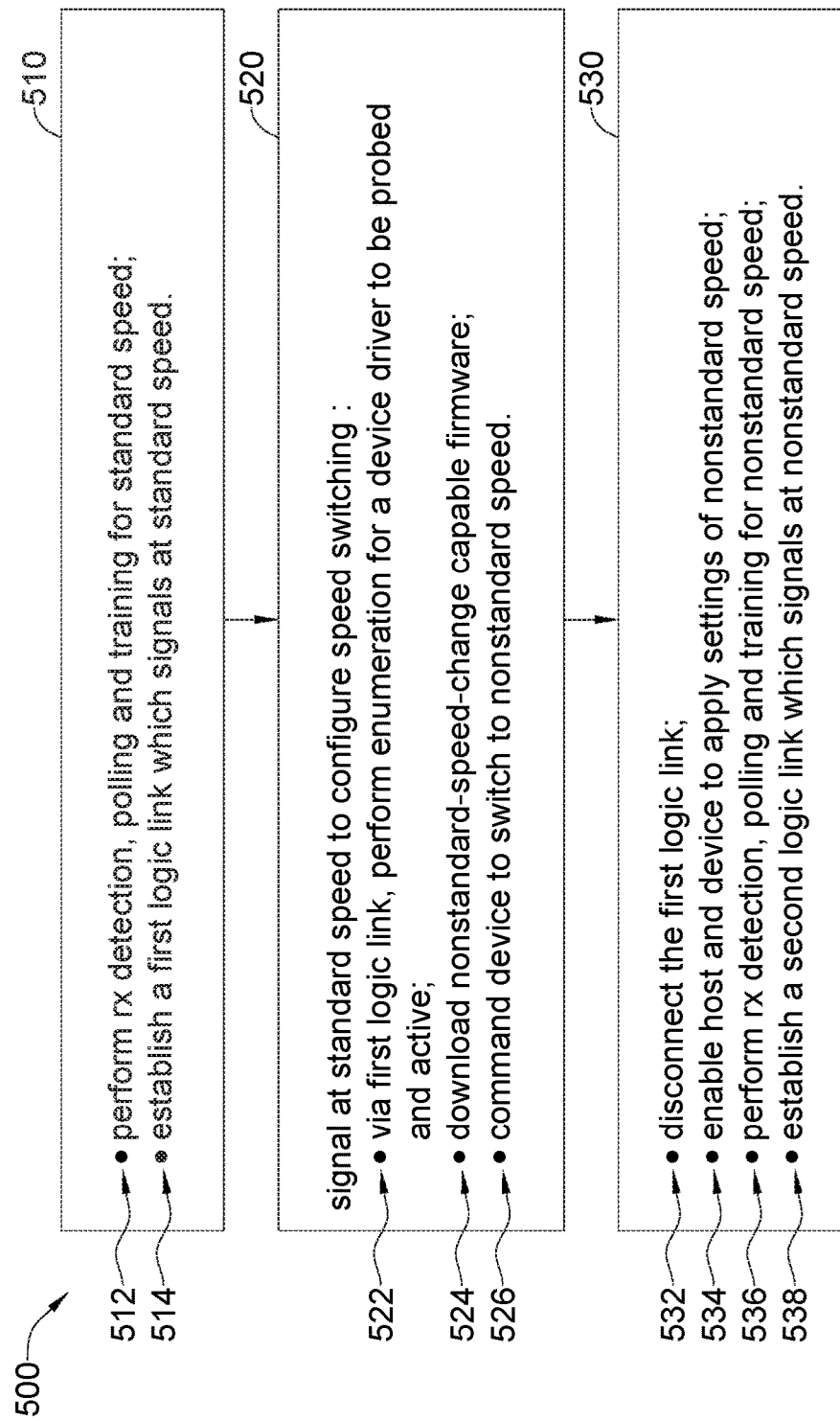
FIG. 5 illustrates a flowchart according to an embodiment of the invention.
Figure 6:
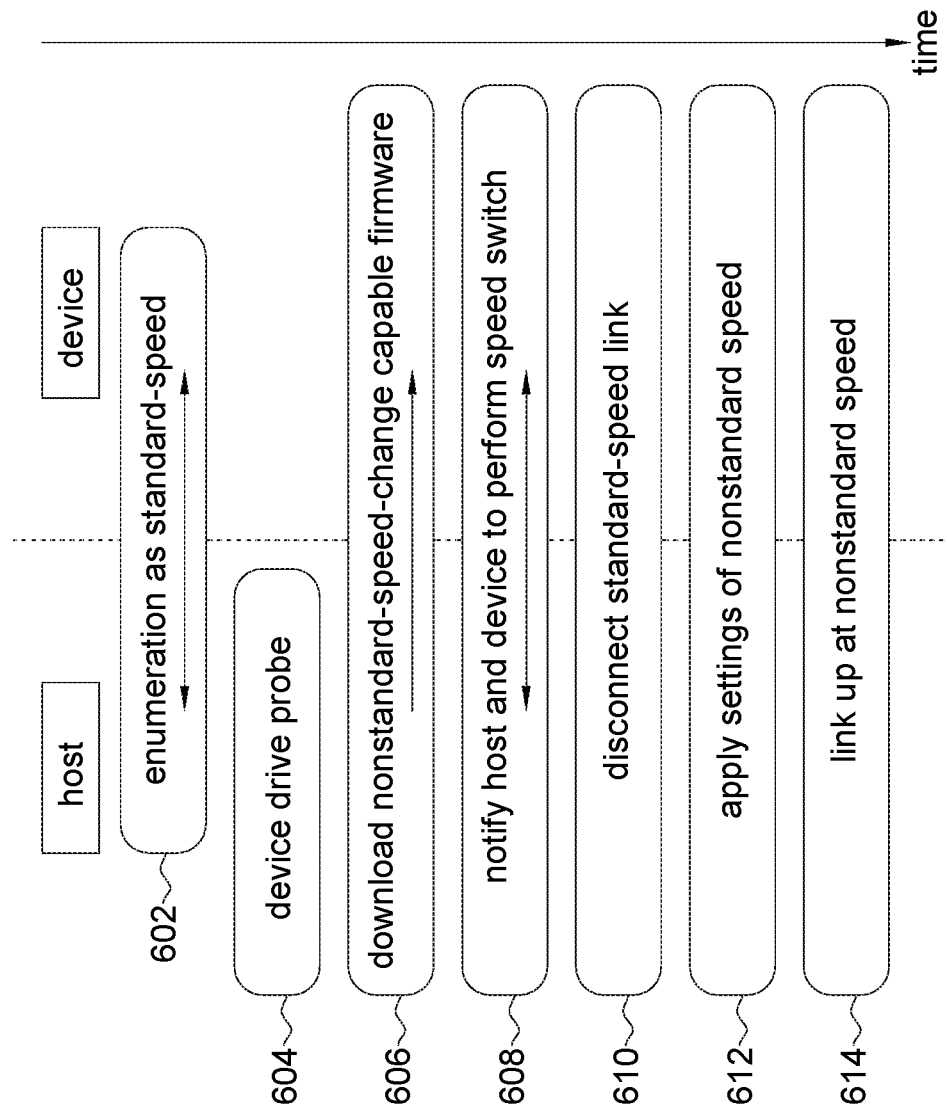
FIG. 6 illustrates operations when the two electronic apparatuses execute the flowchart shown in FIG. 5.

Along with FIG. 4a, please refer to FIG. 5 and FIG. 6; FIG. 5 illustrates a flowchart 500 according to an embodiment of the invention. By executing the flowchart 500, the interface circuits 40a and 40b may signal at the standard speed to configure the speed switching from the standard speed to the nonstandard speed, then stop signaling at the standard speed, and start signaling at the nonstandard speed to avoid interference. FIG. 6 illustrates operations when the two electronic apparatuses 20a and 20b execute the flowchart shown in FIG. 5. Main steps of the flowchart 500 may be described as follows.

Step 502: start signaling at the standard speed by steps 512 and 514 At step 512, each of the controllers 50a and 50b may cooperate with the other to perform a first receiver detection to detect receiver termination of the physical layer circuits 60a and 60b, a first polling by a first LFPS (Low-Frequency Periodic Signaling) handshaking to establish DC operation points of the physical layer circuits 60a and 60b, and a first training (e.g., receiver equalization training, bit lock training and symbol lock training) to prepare and initialize bus signaling at the standard speed. Then, at step 514, the controllers 50a and 50b may establish a first logic link for fully functional signaling (e.g., a U0 state as described in the USB specification) via the bus 70 at the standard speed.

Step 520: signal at the standard speed to configure a speed switching from the standard speed to the nonstandard speed, so the controllers 50a and 50b may then respond the speed switching by enabling the physical layer circuits 60a and 60b to signal via the bus at the nonstandard speed. Step 520 may include steps 522, 524 and 526. At step 522 (also operation 602 shown in FIG. 6), the controllers 50a and 50b may cooperate via the first logic link for enabling the host electronic apparatus 20a to perform an enumeration for a device driver to be probed and active. During the enumeration, the controller 50b may send identification (descriptions) of the device electronic apparatus 20b to the host electronic apparatus 20a via the first logic link at the standard speed, and the controller 50a may accordingly inform the kernel implemented by the processor 30a. According to the identification (e.g., vendor and/or product identifications), the kernel may find (probe) a device driver associated with the device electronic apparatus 20b, and load the device driver to be executed, as shown in operation 604 of FIG. 6. The device driver may include codes and settings to configure the speed switching.

By executing the device driver, at step 524 (also operation 606 in FIG. 6) which may be optional, the kernel may instruct the interface circuit 40b to download a nonstandard-speed-change capable firmware from the interface circuit 40a, if necessary. The interface circuit 40b may already have an existed nonstandard-speed-change capable firmware for controlling the interface circuit 40b to signal at the nonstandard speed; however, if the device driver has an improved (updated) nonstandard-speed-change capable firmware, the interface circuit 40b may download and adopt the improved nonstandard-speed-change capable firmware. Downloading the improved nonstandard-speed-change capable firmware is beneficial for flexibility and adaptiveness, because the nonstandard-speed-change capable firmware can be kept up-to-date, also can include new and expanded functionalities. During step 524, the physical layer circuit 60a may transmit the (improved) nonstandard-speed-change capable firmware to the electronic apparatus 20b via the bus 70 at the standard speed, and the physical layer circuit 60b may receive the nonstandard-speed-change capable firmware.

By execute the device driver, the kernel may then command the interface circuit 40b via the first logic link to switch to the nonstandard speed at step 526 (also operation 608 in FIG. 6) by stopping signaling at the standard speed, also notify the interface circuit 40a to switch to the nonstandard speed. That is, the physical layer circuit 60a may transmit speed-switching commands to the electronic apparatus 20b via the bus 70 at the standard speed, the physical circuit 60b may receive the speed-switching commands, and then the controller 50b may execute the speed-switching commands to control the physical layer circuit 60b to stop signaling at the standard speed; on the other hand, the controller 50a may control the physical layer circuit 60a to stop signaling at the standard speed when the controller 50b of the electronic apparatus 20b executes the speed-switching commands.

Step 530: disconnect the first logic link and start a second logic link which signals at the nonstandard speed. Step 530 may include steps 532, 534, 536 and 538. Following step 526, the controllers 50a and 50b disconnect the first logic link at step 532 (also operation 610 in FIG. 6) since both the interface circuits 40a and 40b stop signaling at the standard speed. At step 534 (also operation 612 in FIG. 6), the controller 50b of the device electronic apparatus 20b may execute the nonstandard-speed-change capable firmware to apply settings of the nonstandard speed to the interface circuit 40b, the controller 50a may also apply settings of the nonstandard speed to the interface circuit 40a.

At step 536, based on the settings of the nonstandard speed, the controllers 50a and 50b may cooperate to perform a second receiver detection, a second polling by a second LFPS handshaking, and a second training to prepare and initialize signaling at the nonstandard speed, and accordingly enable a second enumeration. Then, at step 538 (also operation 614 in FIG. 6), the controllers 50a and 50b may control the physical layer circuits 60a and 60b to start signaling at the nonstandard speed by establishing a full-functional second logic link which signals (e.g., communicates and transports data) via the bus 70 at the nonstandard speed.

Because the controllers 50a and 50b along with the physical layer circuits 60a and 60b can support links both at the standard speed (step 514) and the nonstandard speed (step 526), the interface circuits 40a and 40b are backward compatible. That is, if a conventional device electronic apparatus incapable of signaling at the nonstandard-speed is attached to the host electronic apparatus 20a, the host electronic apparatus 20a may still signal with the conventional device electronic apparatus at the standard speed. Similarly, if the device electronic apparatus 20b is attached to a conventional host electronic apparatus incapable of signaling at the nonstandard speed, the device electronic apparatus 20b may still signal with the conventional host electronic apparatus at the standard speed.

Initialization (e.g., polling, LFPS handshaking and training) and maintenance of the second logic link may be procedurally similar or identical to initialization and maintenance of the first logic link, but based on different settings; therefore the different settings are applied at step 534 to be prepared for the second logic link of the nonstandard speed. For example, while LFPS handshaking demands the physical layer circuit to keep transmitting pulses during a burst duration, the burst duration of the first LFPS handshaking may be different from (e.g., shorter than) a burst duration of the second LFPS handshaking. While training requires training sequences (ordered sets) of multiple symbols to be transmitted and equalized, unit interval of each symbol for the first training may be different from (e.g., shorter than) unit interval for the second training. In addition, settings of equalization, phase lock, clock recovery and/or data recovery may be different for the standard speed and for the nonstandard speed. Differences of settings may only involve the link layer and the physical layer (FIG. 4b); in other words, higher layer(s), e.g., the framework layer and/or the protocol layer, does not have to be aware of whether the bus 70 is signaling at the standard speed or the nonstandard speed, and therefore does not have to be modified for the additional nonstandard-speed signaling.

Comparing to the flowchart 500, in an alternative embodiment, the two electronic apparatuses 20a and 20b may directly execute steps 536 and 538 to establish the logic link of the nonstandard speed, without performing steps 510 and 520 to signal at the standard speed for configuring speed switching.

According to an embodiment of the invention, the nonstandard speed may be set to 2.5 Gbps, i.e., a half of 5 Gbps SuperSpeed, for convenience of physical layer implementation, because clock(s) utilized by the physical layer circuits 60a and 60b for supporting the nonstandard speed may be handily obtained by performing integer frequency dividing on clock(s) for supporting the standard speed. Though the nonstandard speed is lower than the standard speed, the nonstandard speed is sufficient to bridge modern wireless connection which is about (or below) 1.5 Gbps, if the electronic apparatus 20b is a wireless network adaptor bridging the electronic apparatus 20a to wireless connection via the bus 70 at the nonstandard speed.

To sum up, the invention provides an interference mitigation method via a nonstandard-speed bus link. The invention may implement a system in which two electronic apparatuses are linked directly at the nonstandard speed after the two electronic apparatuses are powered on, or a system which includes a mechanism configurable to switch from standard-speed bus signaling to nonstandard-speed bus signaling, so as to mitigate interference on wireless connection caused by the standard-speed bus signaling, and therefore enhance performance and robustness (e.g., bit error rate and/or signal-to-noise ratio) of wireless connection. Further advantages of the mechanism include backward compatibility and high flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for mitigating interference due to signaling of a bus between two electronic apparatuses, comprising:
    via the bus mechanically compliant to a bus specification, communicating and transporting data at a nonstandard speed, wherein:
        the nonstandard speed is not compliant to the bus specification;
        at least one of the two electronic apparatuses further signals via a wireless connection other than the bus;
        communicating and transporting data via the bus at the nonstandard speed is configured to leak less power at a frequency of the wireless connection, comparing to power leaked at the frequency of the wireless connection by signaling via the bus at a standard speed; and
        the standard speed is compliant to the bus specification, and is substantially different from the nonstandard speed.

2. The method of claim 1 further comprising:
    before communicating and transporting data at the nonstandard speed, signaling via the bus at the standard speed to configure a speed switching from the standard speed to the nonstandard speed.

3. The method of claim 2, wherein signaling via the bus at the standard speed to configure the speed switching comprises:
    via the bus, downloading a nonstandard-speed-change capable firmware from a first one of the two electronic apparatuses to a second one of the two electronic apparatuses at the standard speed; and
    commanding the second one of the two electronic apparatuses to stop signaling at the standard speed via the bus, and to start communicating and transporting data at the nonstandard speed via the bus by executing the nonstandard-speed-change capable firmware.

4. The method of claim 2 further comprising:
    before signaling via the bus at the standard speed to configure the speed switching, performing a first receiver detection, a first polling and a first training to prepare and initialize signaling at the standard speed, and establishing a first logic link between the two electronic apparatuses for signaling via the bus at the standard speed; and
    via the first logic link, performing an enumeration for a device driver to be probed and active according to a result of the enumeration; and
    after configuring the speed switching, disconnecting the first logic link before communicating and transporting data at the nonstandard speed.

5. The method of claim 4 further comprising:
    after disconnecting the first logic link, before communicating and transporting data via the bus at the nonstandard speed, performing a second receiver detection, a second polling and a second training to prepare and initialize signaling at the nonstandard speed, and establishing a second logic link between the two electronic apparatuses for communicating and transporting data via the bus at the nonstandard speed.

6. The method of claim 1, wherein the bus specification is USB specification, the standard speed is 5 Gbps, and the nonstandard speed is lower than the standard speed.

7. The method of claim 1, wherein the nonstandard speed is between the standard speed and a second standard speed which is also compliant to the bus specification.

8. An interface circuit for a bus between two electronic apparatuses, comprising:
    a physical layer circuit coupled to the bus, signaling via the bus at a standard speed to configure a speed switching from the standard speed to a nonstandard speed which is substantially different from the standard speed, and a controller coupled to the physical layer circuit, responding the speed switching by enabling the physical layer circuit to signal via the bus at the nonstandard speed;

wherein the standard speed is compliant to a bus specification, and the nonstandard speed is not compliant to the bus specification; and the controller further:

before the physical layer circuit signals via the bus at the standard speed to configure the speed switching, performs a first receiver detection, a first polling and a first training to prepare and initialize signaling at the standard speed, and establishes a first logic link between the two electronic apparatuses for signaling via the bus at the standard speed; and via the first logic link, enables a first one of the two electronic apparatuses to perform an enumeration for a device driver to be probed and active according to a result of the enumeration; and after the physical layer circuit signals at the standard speed to configure the speed switching, disconnects the first logic link before signaling at the nonstandard speed.

9. The interface circuit of claim 8, wherein the physical layer circuit signals via the bus at the standard speed to configure the speed switching by:

receiving a nonstandard-speed-change capable firmware from a first one of the two electronic apparatuses at the standard speed, and receiving speed-switching commands from the first one of the two electronic apparatuses;

wherein the controller further executes the speed-switching commands to control the physical layer circuit to stop signaling at the standard speed, and executes the nonstandard-speed-change capable firmware to control the physical layer circuit to start signaling at the nonstandard speed.

10. The interface circuit of claim 8, wherein the controller further:

after disconnecting the first logic link, before the physical layer circuit signals via the bus at the nonstandard speed, performs a second receiver detection, a second polling and a second training to prepare and initialize signaling at the nonstandard speed, and establishes a second logic link between the two electronic apparatuses which signals via the bus at the nonstandard speed.

11. The interface circuit of claim 8, wherein the physical layer circuit signals via the bus at the standard speed to configure the speed switching by:

transmitting a nonstandard-speed-change capable firmware to a second one of the two electronic apparatuses, and transmitting speed-switching commands to the second one of the two electronic apparatuses, wherein the controller further controls the physical layer circuit to stop signaling at the standard speed when the second one of the two electronic apparatuses executes the speed-switching commands, and controls the physical layer circuit to start signaling at the nonstandard speed when the second one of the two electronic apparatuses executes the nonstandard-speed-change capable firmware.

12. The interface circuit of claim 8, wherein at least one of the two electronic apparatuses further signals via a wireless connection other than the bus, and the physical layer circuit is configured to form a spectrum notch at a frequency of the wireless connection when signaling via the bus at the nonstandard speed.

13. The interface circuit of claim 8, wherein at least one of the two electronic apparatuses further signals via a wireless connection other than the bus, and the physical layer circuit is configured to leak less power at a frequency of the wireless connection when signaling at the nonstandard speed, comparing to power leaked at the frequency of the wireless connection when signaling via the bus at the standard speed.

14. The interface circuit of claim 8, wherein the bus specification is USB specification, the standard speed is 5 Gbps, and the nonstandard speed is lower than the standard speed.

15. The interface circuit of claim 8, wherein the nonstandard speed is between the standard speed and a second standard speed which is also compliant to the bus specification.

16. The interface circuit of claim 15, wherein the bus specification is USB specification, the standard speeds is 5 Gbps, and the second standard speed is 480 Mbps.

* * * * *